United States Patent
Bolander

(10) Patent No.: US 6,843,752 B2
(45) Date of Patent: Jan. 18, 2005

(54) TORQUE CONVERTER SLIP CONTROL FOR DISPLACEMENT ON DEMAND

(75) Inventor: Thomas E. Bolander, Flint, MI (US)

(73) Assignee: General Motors Corporation, Detroit, MI (US)

( * ) Notice: Subject to any disclaimer, the term of this patent is extended or adjusted under 35 U.S.C. 154(b) by 27 days.

(21) Appl. No.: 10/356,044

(22) Filed: Jan. 31, 2003

(65) Prior Publication Data

US 2004/0152559 A1 Aug. 5, 2004

(51) Int. Cl.$^7$ .............................................. B60K 41/02
(52) U.S. Cl. ........................................................ 477/54
(58) Field of Search .......................... 477/53, 54, 181, 477/175; 123/198 F

(56) References Cited

U.S. PATENT DOCUMENTS

| | | | | | |
|---|---|---|---|---|---|
| 4,585,101 A | * | 4/1986 | Danno | ..................... | 123/198 F |
| 5,374,224 A | * | 12/1994 | Huffmaster et al. | ......... | 477/181 |
| 5,611,754 A | * | 3/1997 | Haga et al. | ................. | 477/181 |
| 5,806,012 A | * | 9/1998 | Maki et al. | ................. | 701/104 |
| 6,655,353 B1 | * | 12/2003 | Rayl | ........................... | 123/436 |

* cited by examiner

Primary Examiner—Sherry Estremsky
(74) Attorney, Agent, or Firm—Christopher DeVries

(57) ABSTRACT

A torque smoothing system for a displacement on demand engine includes an engine having a plurality of cylinders and a torque converter. A controller adjusts a slip rate of the torque converter to a first rate and deactivates one or more of the cylinders. The controller then adjusts the slip rate to a second rate.

23 Claims, 3 Drawing Sheets

TORQUE CONVERTER SLIP CONTROL FOR DISPLACEMENT ON DEMAND

FIELD OF THE INVENTION

The present invention relates to displacement on demand internal combustion engines, and more particularly to engine control systems that vary torque converter slip to smooth displacement on demand transitions.

BACKGROUND OF THE INVENTION

Some internal combustion engines include engine control systems that deactivate cylinders under low load situations. For example, an eight cylinder engine can be operated using four cylinders to improve fuel economy by reducing pumping losses. This process is generally referred to as displacement on demand or DOD.

To smoothly transition between activated and deactivated modes, the internal combustion engine must produce torque with a minimum of disturbances. Otherwise, the transition will not be transparent to the driver. In other words, excess torque will cause engine surge and insufficient torque will cause engine sag, both of which degrade the driving experience.

Conventional engine control systems that provide torque smoothing have been based on brake torque and "as calibrated" spark. Engine control systems using this approach do not account for changes in engine and environmental conditions. This approach also does not meet drivability specifications for maximum torque disturbances allowed during transitions between activated and deactivated modes.

SUMMARY OF THE INVENTION

A torque smoothing system according to the present invention for a displacement on demand engine includes an engine having a plurality of cylinders and a torque converter. A controller adjusts a slip rate of the torque converter to a first rate and deactivates one or more of the cylinders. The controller then adjusts the slip rate to a second rate.

In one feature, the first rate is greater than the second rate.

In other features, the first rate is within a range of 80 to 100 revolutions per minute. The second rate is within a range of 20 to 40 revolutions per minute.

In still another feature, the controller ramps the slip rate based on a rotational speed of the torque converter and a target time for achieving the second rate.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
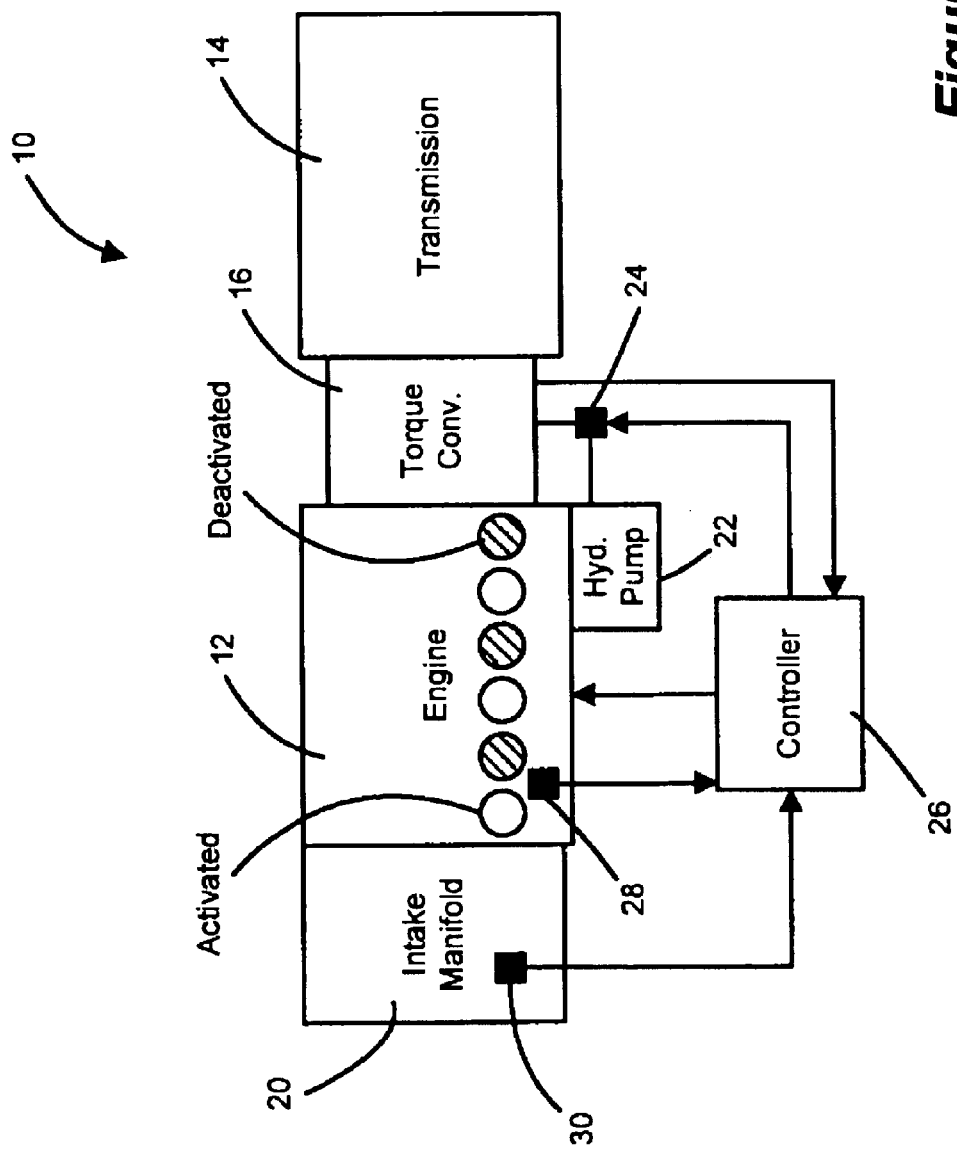
FIG. 1 is a functional block diagram illustrating a vehicle powertrain including a controller that varies torque converter slip to smooth DOD transitions according to the present invention.

The following description of the preferred embodiment is merely exemplary in nature and is in no way intended to limit the invention, its application, or uses. For purposes of clarity, the same reference numbers will be used in the drawings to identify similar elements. As used herein, activated refers to operation using all of the engine cylinders. Deactivated refers to operation using less than all of the cylinders of the engine (one or more cylinders not active).

Referring now to FIG. 1, a vehicle 10 includes an engine 12 that drives an automatic transmission 14 through a torque converter 16. The engine 12 includes N cylinders 18 that are selectively deactivated during engine operation. Although FIG. 1 depicts six cylinders (N=6), it can be appreciated that the engine 12 may include additional or fewer cylinders 18. For example, engines having 4, 6, 8, 10, 12 and 16 cylinders are contemplated. Air flows into the engine 12 through an intake manifold 20 and is combusted with fuel in the cylinders 18. A hydraulic pump 22 is driven by the engine 12 to selectively supply pressurized hydraulic fluid to the torque converter 16 through a solenoid valve 24. A duty cycle of the solenoid valve 24 varies the supply of pressurized fluid to the torque converter 16.

A controller 26 communicates with the engine 12, the torque converter 16, the solenoid valve 24, an engine speed sensor 28, and an intake manifold pressure sensor 30. The controller 26 receives a signal from the pressure sensor 30 indicative of engine load. More particularly, as engine load varies, vacuum pressure within the intake manifold 20 correspondingly varies and is sensed by the pressure sensor 30. Although the exemplary embodiment uses vacuum pressure to indicate engine load, it can be appreciated that other methods of determining engine load can be employed. During periods of light engine load, the controller 26 communicates with the engine 12 to enable displacement on demand (DOD). DOD occurs via deactivation of one or more cylinders 18. In an exemplary embodiment, N/2 cylinders 18 are deactivated. Upon deactivation of the cylinders 18, the controller 26 communicates with the engine 12 to increase the power output of the remaining cylinders 18.

The controller 26 varies the duty cycle of the solenoid valve 24 to control the flow of pressurized fluid to the torque converter 16. A slip rate of the torque converter 16 is varied using the pressurized hydraulic fluid. Slipping of the torque converter 16 compensates for torque pulses through the vehicle 10 resulting from cylinder deactivation according to the present invention.

Figure 2:
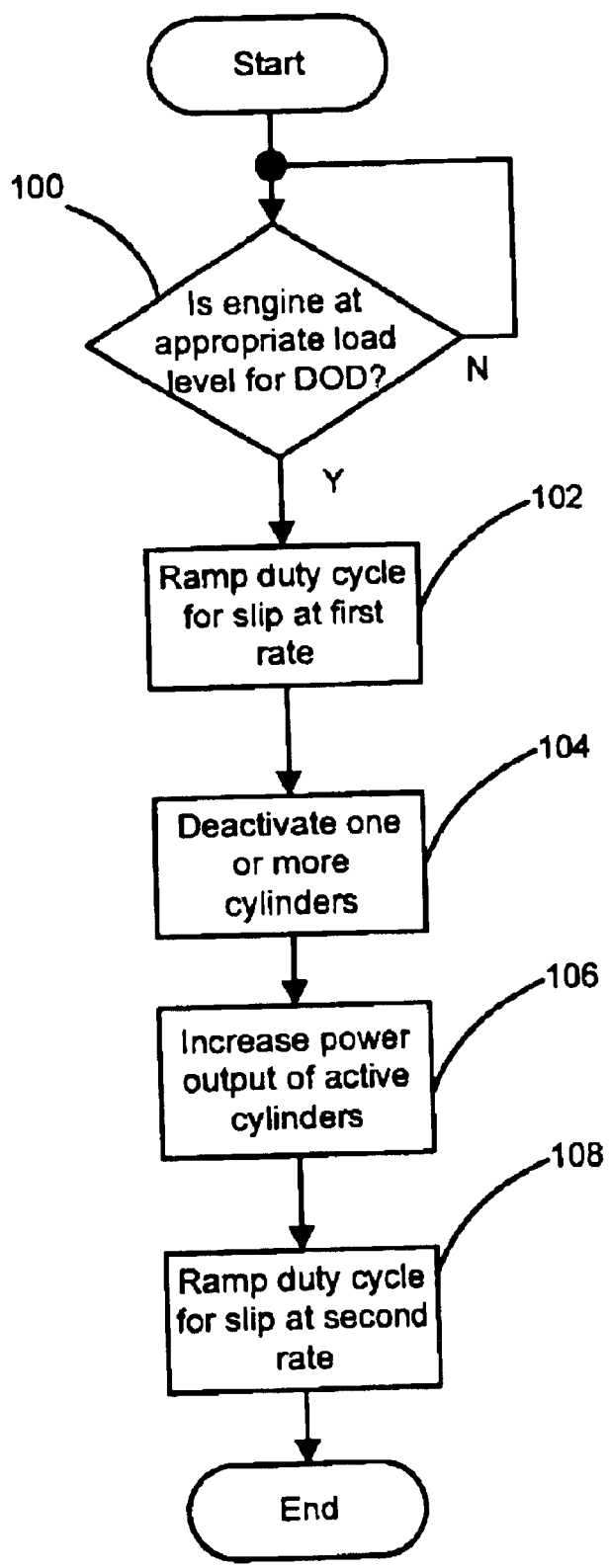
FIG. 2 is a flowchart illustrating steps of a torque smoothing method for the DOD engine according to the present invention.
Figure 3:
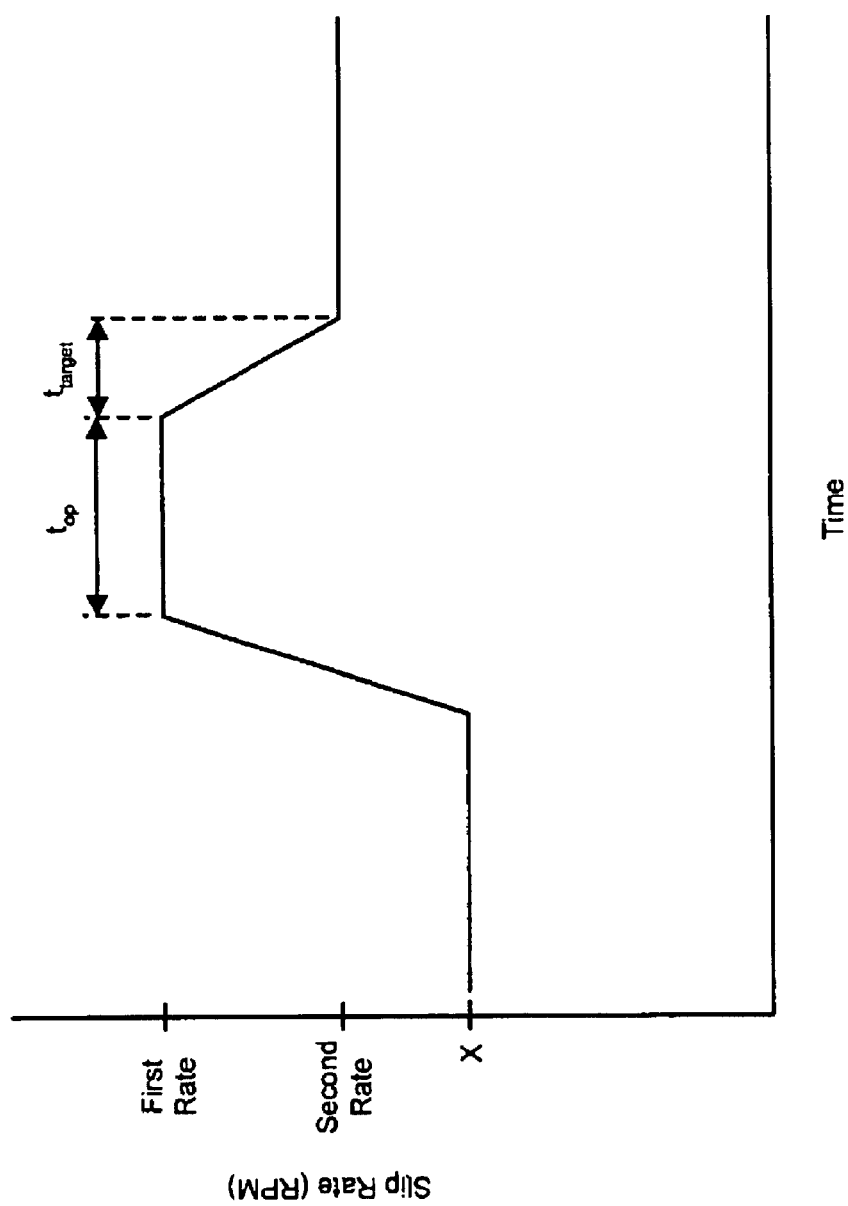
FIG. 3 is a graph illustrating exemplary slip rates of the torque converter as a function of time.

Referring now to FIG. 2, a method of smoothing torque in the DOD of the engine 12 will be described. In step 100, the controller 26 determines whether the engine 12 is operating at an appropriate load level (i.e., reduced engine load) for the deactivated mode. This is achieved by comparing the signal from the pressure sensor 30 to a calibration value stored in memory. If the engine 12 is operating at a reduced engine load, the controller 26 continues with step 102. If not, the controller 26 loops back to step 100.

In step 102, the controller 26 varies the duty cycle of the solenoid valve 24 to ramp the slip rate of the torque converter 16 to a first rate from an initial slip rate of X revolutions per minute (RPMs). It will be appreciated that the initial slip rate of the torque converter 16 may be 0 RPMs (e.g., torque converter 16 locked) or greater.

The first rate is greater than the initial slip rate. For example, the first rate can be within an exemplary range of approximately 80 to 100 RPMS. The exact value of the first rate varies based on the particular vehicle configuration. If the torque converter 16 is locked (i.e., X=0 RPMs), the controller 26 signals unlocking prior to varying the duty cycle of the solenoid valve 24. The torque converter 16 operates at the first slip rate over an operational time period ($t_{op}$). The operational time period is a calibrated based on engine rotation.

In step 104, the controller 26 signals the engine 12 to deactivate one or more cylinders at the beginning of the operational time period. The controller 26 then signals the engine 12 to increase the power output of the remaining cylinders 18 in step 106. In step 108, the controller 26 varies the duty cycle of the solenoid valve 24 to ramp the slip rate to a second rate at the end of the operational time period. The second rate is less than the first rate. An exemplary range for the second rate is 20 to 40 RPMs. The exact value of the second rate varies based on the particular vehicle configuration. Factors that influence the value of the second rate include the amount of torque disturbances expected, the particular transmission configuration, and noise and vibration (NV) characteristics of the particular vehicle. Ramping between the first and second rates occurs over a target time ($t_{target}$). The target time is a calibrated parameter based on the engine speed signal received by the controller 26. Once step 108 is complete, control ends.

The present invention enables smooth torque transitions during deactivation of the cylinders 18. Adjusting the slip rate of the torque converter during deactivation of the cylinders 18 prevents torque spikes from transferring through to the drivetrain to the vehicle occupants. The transition between a first, faster slip rate to a second, slower slip rate prevents crashing of the torque converter during cylinder deactivation.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A torque smoothing system for a displacement on demand engine, comprising:
    an engine having a plurality of cylinders;
    a torque converter;
    a controller that adjusts a slip rate of said torque converter to a first rate, deactivates one or more of said cylinders, and adjusts said slip rate to a second rate; and
    wherein said controller varies said slip rate in response to an engine load.

2. The torque smoothing system of claim 1, further comprising:
    an intake manifold; and
    an intake manifold pressure sensor that senses a vacuum level to estimate said engine load.

3. The torque smoothing system of claim 1 wherein said first rate is within a range of 80 to 100 revolutions per minute.

4. The torque smoothing system of claim 1 wherein said second rate is within a range of 20 to 40 revolutions per minute.

5. The torque smoothing system of claim 1 wherein said first rate is greater than said second rate.

6. The torque smoothing system of claim 1 wherein said controller ramps said slip rate based on a rotational speed of said torque converter and a target time for achieving said second rate.

7. The torque smoothing system of claim 1 wherein said controller operates said torque converter at said first raze for a predetermined time period based on engine speed.

8. A method of controlling displacement on demand transitions of an engine, comprising:
    setting a slip rate of a torque converter to a first rate;
    deactivating at least one cylinder of said engine;
    setting said slip rate of said torque converter to a second rate; and
    operating said torque converter at said first rate for a predetermined time period based on engine speed.

9. The method of claim 8 further comprising unlocking said torque converter.

10. The method of claim 8 wherein said first rate is within a range of 80 to 100 revolutions per minute.

11. The method of claim 8 wherein said second rate is within a range of 20 to 40 revolutions per minute.

12. The method of claim 8 wherein said first rate is greater than said second rate.

13. The method of claim 8 further comprising:
    determining a rotational speed of said torque converter;
    determining a target time period; and
    wherein said step of ramping said slip rate to said second rate is based on said rotational speed and said target time period.

14. The method of claim 8 further comprising increasing a power output of remaining cylinders of said engine.

15. The method of claim 8 wherein said deactivating occurs during low engine load.

16. The method of claim 15 further comprising sensing an intake manifold pressure to estimate engine load.

17. A method of smoothing torque transfer in a displacement on demand engine, comprising:
    sensing a low load condition of an engine;
    setting a slip rate of a torque converter to a first rate;
    deactivating at lease one cylinder of said engine; and
    setting said slip rate of said torque converter to a second rate based on a rotational speed of said torque converter and a target time.

18. The method of claim 17 further comprising operating said torque converter at said first rate for a predetermined time period based on engine speed.

19. The method of claim 17 further comprising unlocking said torque converter.

20. The method of claim 17 wherein said first rate is within a range of 80 to 100 revolutions per minute.

21. The method of claim 17 wherein said second rate is within a range of 20 to 40 revolutions per minute.

22. The method of claim 17 wherein said first rate is greater than said second rate.

23. The method of claim 17 further comprising sensing an intake manifold pressure indicative of said engine condition.

* * * * *